US012809285B2

(12) United States Patent
Kadokura et al.

(10) Patent No.: US 12,809,285 B2
(45) Date of Patent: Nov. 24, 2026

(54) CARRIER FOR DEVELOPING ELECTROSTATIC CHARGE IMAGE AND METHOD FOR PRODUCING THE SAME, ELECTROSTATIC CHARGE IMAGE DEVELOPER, PROCESS CARTRIDGE, IMAGE FORMING APPARATUS, AND IMAGE FORMING METHOD

(71) Applicant: FUJIFILM Business Innovation Corp., Tokyo (JP)

(72) Inventors: Yasuo Kadokura, Kanagawa (JP); Shintaro Anno, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 1012 days.

(21) Appl. No.: 17/902,296

(22) Filed: Sep. 2, 2022

(65) Prior Publication Data

US 2023/0288828 A1 Sep. 14, 2023

(30) Foreign Application Priority Data

Mar. 8, 2022 (JP) ................................ 2022-035225

(51) Int. Cl.
*G03G 9/113* (2006.01)
*G03G 9/107* (2006.01)
*G03G 21/18* (2006.01)

(52) U.S. Cl.
CPC ........... *G03G 9/1139* (2013.01); *G03G 9/107* (2013.01); *G03G 9/1131* (2013.01); *G03G 21/1814* (2013.01)

(58) Field of Classification Search
CPC ............................. G03G 9/1139; G03G 9/107
See application file for complete search history.

(56) References Cited

U.S. PATENT DOCUMENTS 5,336,580 A * 8/1994 Tavernier ............... G03G 9/108 430/111.3
10,955,765 B2 3/2021 Onozaki et al.
2014/0051022 A1* 2/2014 Shoji .................... G03G 9/1075 399/119
2019/0384201 A1* 12/2019 Kadonome ........ G03G 9/09708

FOREIGN PATENT DOCUMENTS

JP 7-56395 A 3/1995
JP 2011-65092 A 3/2011
JP 2018146848 A * 9/2018
JP 2018-155970 A 10/2018
JP 2020-091471 A 6/2020
JP 2021-135470 A 9/2021

OTHER PUBLICATIONS

Toki, Machine Translation of JP 2018-146848A, Sep. 20, 2018 (Year: 2018).*
Japanese Office Action dated Sep. 30, 2025 in Application No. 2022-035225.

* cited by examiner

*Primary Examiner* — Peter L Vajda
*Assistant Examiner* — Jenna Kuipers
(74) *Attorney, Agent, or Firm* — Sughrue Mion, PLLC

(57) ABSTRACT

A carrier for developing an electrostatic charge image includes magnetic particles and a resin coating layer covering the magnetic particles, the resin coating layer containing aggregates of inorganic particles. The arithmetic mean diameter of the aggregates of inorganic particles on the carrier surface is 30 nm or more and 150 nm or less, and the percentage surface exposure of the magnetic particles is 0% by area or more and 5% by area or less.

19 Claims, 2 Drawing Sheets

CARRIER FOR DEVELOPING ELECTROSTATIC CHARGE IMAGE AND METHOD FOR PRODUCING THE SAME, ELECTROSTATIC CHARGE IMAGE DEVELOPER, PROCESS CARTRIDGE, IMAGE FORMING APPARATUS, AND IMAGE FORMING METHOD

CROSS-REFERENCE TO RELATED APPLICATIONS

This application is based on and claims priority under 35 USC 119 from Japanese Patent Application No. 2022-035225 filed Mar. 8, 2022.

BACKGROUND

(i) Technical Field

The present disclosure relates to a carrier for developing an electrostatic charge image and a method for producing the same, an electrostatic charge image developer, a process cartridge, an image forming apparatus, and an image forming method.

(ii) Related Art

Japanese Unexamined Patent Application Publication No. 2020-091471 discloses a magnetic carrier that includes magnetic carrier particles having magnetic carrier core particles and a resin coating layer on the surface thereof and also includes inorganic fine particles A on the surface of the magnetic carrier particles. Inorganic fine particles A are cuboid in shape and have a number-average diameter (D1) of 10 nm to 60 nm, and their surface has been treated with a surface treatment agent. Relationship (1), below, holds true, where SP1 is the solubility parameter $(J/mol)^{1/2}$ of the resin coating layer, and SP2 is that of the surface treatment agent. On the surface of the magnetic carrier, the percentage coverage of inorganic fine particles A as measured by ESCA is between 5.0 atom % and 20.0 atom %.

$$SP1-SP2\leq 14.00 \quad (1)$$

Japanese Unexamined Patent Application Publication No. 2018-155970 discloses a developing device that holds a developer containing a carrier and toner and develops, using the developer, an electrostatic latent image formed on an electrostatic latent image carrier. The device includes a developer carrier, which is opposite the electrostatic latent image carrier and transports the developer; and a developer regulator, which regulates the amount of the developer carried by the developer carrier. The carrier contains core particles and a resin coating layer covering the core particles, and the resin coating layer contains a resin, carbon black, and two types of inorganic fine particles A and B. The resin coating layer has a concentration gradient for inorganic fine particles A and the carbon black parallel to the thickness thereof, with the concentration of inorganic fine particles A increasing toward the surface of the carrier and that of the carbon black decreasing toward the surface of the carrier, and the percentage by volume of the carbon black is 0% or more and 30% or less at depths between 0.0 μm and 0.1 μm from the surface of the resin coating layer closer to the surface of the surface. The developer carrier is subjected to a developing bias composed of a DC component and a 5-kHz or higher-frequency AC component superimposed thereon.

SUMMARY

Aspects of non-limiting embodiments of the present disclosure relate to a carrier for developing an electrostatic charge image that includes magnetic particles and a resin coating layer covering the magnetic particles. This carrier may help reduce unevenness in the gloss of the resulting image, compared with those for which the arithmetic mean diameter of aggregates of inorganic particles on the carrier surface is less than 30 nm or more than 150 nm or for which the percentage surface exposure of the magnetic particles exceeds 5% by area.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a carrier for developing an electrostatic charge image, the carrier including magnetic particles and a resin coating layer covering the magnetic particles, the resin coating layer containing aggregates of inorganic particles, wherein: an arithmetic mean diameter of the aggregates of inorganic particles on a carrier surface is 30 nm or more and 150 nm or less; and a percentage surface exposure of the magnetic particles is 0% by area or more and 5% by area or less.

BRIEF DESCRIPTION OF THE DRAWINGS

Exemplary embodiments of the present disclosure will be described in detail based on the following figures, wherein.

DETAILED DESCRIPTION

Figure 1:
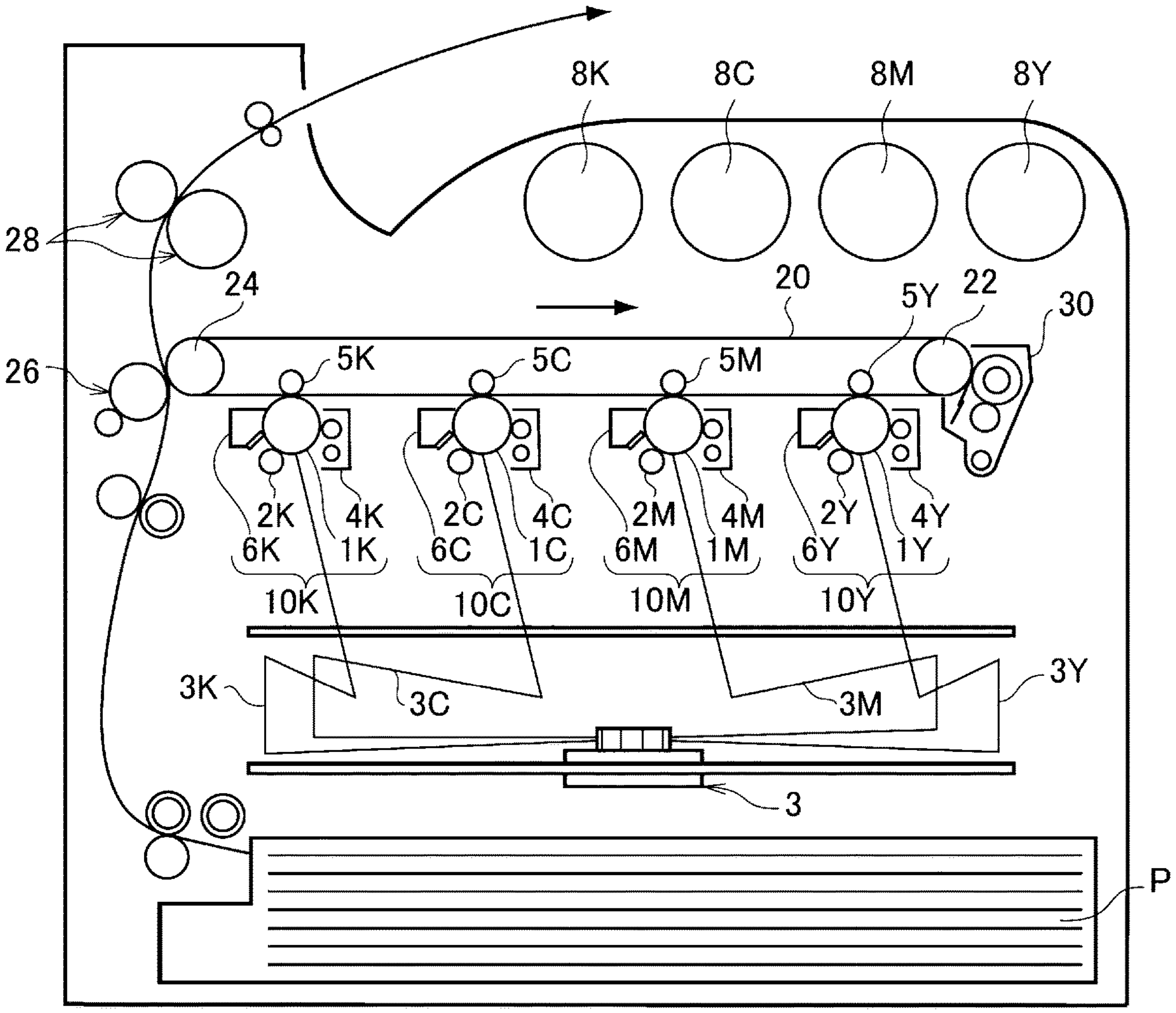
FIG. 1 is a schematic diagram illustrating the structure of an example of an image forming apparatus according to an exemplary embodiment.

The following describes exemplary embodiments of the present disclosure. The following description and Examples are for illustrative purposes and do not limit the scope in which aspects of the present disclosure can be embodied.

Numerical ranges specified herein with "A-B," "between A and B," "(from) A to B," etc., represent inclusive ranges, which include the minimum A and the maximum B as well as all values in between.

The following description also includes series of numerical ranges. In such a series, the upper or lower limit of a numerical range may be substituted with that of another in the same series. The upper or lower limit of a numerical range, furthermore, may be substituted with a value indicated in the Examples section.

A gerund or action noun used in relation to a certain process or method herein does not always represent an independent action. As long as its purpose is fulfilled, the action represented by the gerund or action noun may be continuous with or part of another.

An exemplary embodiment herein may be described with reference to drawing(s). The reference, however, does not mean what is illustrated is the only possible configuration of the exemplary embodiment. The size of elements in each drawing is conceptual; the relative sizes of the elements do not need to be as illustrated.

An ingredient herein may be a combination of multiple substances. If a composition described herein contains a combination of multiple substances as one of its ingredients, the amount of the ingredient represents the total amount of the substances in the composition unless stated otherwise.

An ingredient herein, furthermore, may be a combination of multiple kinds of particles. If a composition described herein contains a combination of multiple kinds of particles as one of its ingredients, the diameter of particles of the ingredient is that of the mixture of the multiple kinds of particles present in the composition unless stated otherwise.

As used herein, the term "(meth)acrylic" refers to at least one of acrylic or methacrylic, and "(meth)acrylate" refers to at least one of an acrylate or a methacrylate.

A "toner for developing an electrostatic charge image" may be referred to as "toner" herein. Likewise, a "carrier for developing an electrostatic charge image" may be referred to as a "carrier," and an "electrostatic charge image developer" may be referred to as a "developer."

Carrier for Developing an Electrostatic Charge Image

A carrier according to an exemplary embodiment for developing an electrostatic charge image includes magnetic particles and a resin coating layer covering the magnetic particles. The resin coating layer contains aggregates of inorganic particles. The arithmetic mean diameter of the aggregates of inorganic particles on the carrier surface is 30 nm or more and 150 nm or less, and the percentage surface exposure of the magnetic particles is 0% by area or more and 5% by area or less.

In printing an image with this type of carrier, the resin coating layer peels off the carrier. The fragments of the resin coating layer adhere to the toner during development and transfer and remain there even when the image is fixed. The fixation heat melts the fragments of the resin coating layer, but the molten fragments stick firmly to the fixing element and do not peel well, often causing gloss unevenness, especially on small-grammage coated paper.

The carrier according to this exemplary embodiment for developing an electrostatic charge image has a resin coating layer containing aggregates of inorganic particles. The arithmetic mean diameter of the aggregates of inorganic particles on the carrier surface is 30 nm or more and 150 nm or less, and the percentage surface exposure of the magnetic particles is 0% by area or more and 5% by area or less. The aggregates of inorganic particles present on the carrier surface may serve as a spacer that will reduce the stress the carrier undergoes inside the developing component, and the high coverage of the resin coating layer may help prevent the resin coating layer from peeling when undergoing stress inside the developing component. The resulting image, therefore, may suffer a smaller degree of gloss unevenness caused by peeling off of the resin coating layer during fixation.

On the surface of the carrier according to this exemplary embodiment, the percentage exposure of the magnetic particles is 0% or more and 5% or less.

If the percentage exposure of the magnetic particles on the surface of the carrier exceeds 5%, the resin coating layer will easily peel when undergoing stress inside the developing component. The resulting image, therefore, will suffer a greater degree of gloss unevenness caused by peeling off of the resin coating layer during fixation.

The percentage surface exposure of the magnetic particles on the surface of the carrier may be 0% or more and 4% or less for further reduction of unevenness in the gloss of the resulting image (hereinafter also referred to as "for further reduced gloss unevenness"). Preferably, the percentage surface exposure is 0% or more and 3% or less, more preferably 0% or more and 0.5% or less.

In this exemplary embodiment, the percentage surface exposure of the magnetic particles on the carrier surface is that determined as follows.

A scanning electron microscope (SEM) image of the carrier surface at a magnification of 1,500 times is binarized. The proportion of the exposed area of the magnetic particles to the total area of the carrier is the percentage surface exposure (%) of the magnetic particles.

The Si/C ratio on the carrier surface as measured by x-ray photoelectron spectroscopy, furthermore, may be 0.05 or higher and 1.5 or lower for further reduced gloss unevenness. Preferably, the Si/C ratio is 0.05 or higher and 1.0 or lower, more preferably 0.2 or higher and 0.9 or lower.

In that case, the aggregates of inorganic particles in the resin coating layer may be aggregates of silica particles.

This Si/C ratio on the carrier surface is that determined by x-ray photoelectron spectroscopy (XPS) as follows.

The elemental composition of the carrier surface is analyzed using JPS-9000MX analyzer (JEOL Ltd.) in Normal depth mode with an x-ray intensity of 10 kV/30 mA. The area of the peak for Si and that of the peak for C are measured, and the ratio is calculated from the measured areas.

The carrier according to this exemplary embodiment may have a cavity at least in part between the resin coating layer and the surface of the magnetic particles.

If, for example, the resin coating layer is formed through a dry process as described later herein, the average width, or the average length parallel to the thickness of the resin coating layer, of the cavity tends to be 50 nm or more.

The average width, or the average length parallel to the thickness of the resin coating layer, of the cavity may be 50 nm or more for further reduced gloss unevenness. Preferably, the average cavity width is 50 nm or more and 500 nm or less, more preferably 50 nm or more and 300 nm or less, even more preferably 100 nm or more and 250 nm or less.

The carrier according to this exemplary embodiment may have, for further reduced gloss unevenness, such a cavity covering a percentage area of 0% or more and 5% or less to the total area of the carrier.

The percentage area of the cavity may be even smaller. The percentage area of the cavity to the total area of the carrier may be 4% or less, preferably 3% or less, for further reduced gloss unevenness.

The percentage area of the cavity to the total area of the carrier may be, for further reduced gloss unevenness, 0.05% or more. Preferably, the percentage area of the cavity is 0.1% or more, more preferably 0.2% or more.

In this exemplary embodiment, the average width and the percentage area of the cavity between the magnetic particles and the resin coating layer are those measured through the observation of a cross-section of the carrier as follows.

A portion of the carrier is mixed into epoxy resin, and the epoxy resin is cured. The resulting solid is cut using an ultramicrotome to give a slice having a thickness of 100 nm or more and 200 nm or less. The slice is observed with a field-emission scanning electron microscope (FE-SEM; e.g., Hitachi High-Technologies S-4800) at a magnification of 5000 times, and the cross-section is imaged. The cross-sectional image is analyzed using image analysis software (WinROOF 2015, Mitani Corporation) to determine the maximum width, or the maximum length parallel to the thickness of the resin coating layer, of the cavity between the magnetic particles and the resin coating layer. The maximum width, or maximum length parallel to the thickness of the resin coating layer, of the cavity in 100 carrier particles is measured. The arithmetic mean of the measured widths is the average width, or average length parallel to the thickness of the resin coating layer, of the cavity.

Separately, the cross-sectional area of one carrier particle (the combined area of the magnetic particle, the resin coating layer, and the cavity) and the area of the cavity between the magnetic particle and the resin coating layer are determined, and the percentage area (%) of the cavity to the cross-sectional area of that carrier particle is calculated. The arithmetic mean of the percentage area (%) of the cavity in 100 carrier particles is the percentage area of the cavity.

The following describes the structure of the carrier according to this exemplary embodiment in detail.

Resin Coating Layer

The carrier according to this exemplary embodiment for developing an electrostatic charge image includes a resin coating layer covering the magnetic particles. The resin coating layer contains aggregates of inorganic particles, and the arithmetic mean diameter of the aggregates of inorganic particles on the carrier surface is 30 nm or more and 150 nm or less.

As used in this exemplary embodiment, the term "aggregate of inorganic particles" includes any particle resulting from the aggregation of two or more of the inorganic particles.

The arithmetic mean diameter of the aggregates of inorganic particles in the resin coating layer is 30 nm or more and 150 nm or less and may be 50 nm or more and 150 nm or less for further reduced gloss unevenness. Preferably, this arithmetic mean diameter is 80 nm or more and 150 nm or less, more preferably 90 nm or more and 140 nm or less.

The average diameter of primary particles of the inorganic particles in the resin coating layer may be, for further reduced gloss unevenness, 5 nm or more and 90 nm or less. Preferably, this average diameter is 5 nm or more and 70 nm or less, more preferably 5 nm or more and 50 nm or less, even more preferably 8 nm or more and 50 nm or less.

The average thickness of the resin coating layer may be 0.2 μm or more and 3.0 μm or less, preferably 0.3 μm or more and 2.0 μm or less, more preferably 0.4 μm or more and 1.5 μm or less.

In this exemplary embodiment, the arithmetic mean diameter of the aggregates of inorganic particles in the resin coating layer, the average diameter of primary particles of the inorganic particles, and the average thickness of the resin coating layer are those determined as follows.

A portion of the carrier embedded in a piece of epoxy resin is sliced using a microtome to expose its cross-section. The cross-section is imaged with a scanning electron microscope (SEM), and the resulting SEM image is loaded into an image analyzer and analyzed.

One hundred aggregates of inorganic particles in the resin coating layer are selected randomly, and the maximum length (nm) of each aggregate is measured. The arithmetic mean of the measured lengths is the arithmetic mean diameter (nm) of the aggregates of inorganic particles.

One hundred inorganic particles (primary particles) in the resin coating layer are selected randomly, and the equivalent circular diameter (nm) of each particle is determined. The arithmetic mean of the determined diameters is the average diameter of the inorganic particles (nm).

The thickness (μm) of the resin coating layer, furthermore, is measured at ten randomly selected points of one carrier particle, and this is repeated for 100 particles of the carrier. The arithmetic mean of all measurements is the average thickness (μm) of the resin coating layer.

Examples of inorganic particles that can be contained in the resin coating layer include particles of metal oxides, such as silica, titanium oxide, zinc oxide, and tin oxide; particles of metal compounds, such as barium sulfate, aluminum borate, and potassium titanate; and particles of metals, such as gold, silver, and copper.

Silica particles, in particular, may help further reduce gloss unevenness.

The surface of the inorganic particles and that of the aggregates of inorganic particles may have been rendered hydrophobic. Examples of hydrophobizing agents include known organic silicon compounds having an alkyl (e.g., methyl, ethyl, propyl, or butyl) group, specifically alkoxysilane compounds, siloxane compounds, silazane compounds, etc. An example of a silazane compound is hexamethyldisilazane. One hydrophobizing agent may be used alone, or two or more may be used in combination.

Inorganic particles and aggregates thereof may be rendered hydrophobic with a hydrophobizing agent by, for example, using supercritical carbon dioxide. In that case, a solution of the hydrophobizing agent in supercritical carbon dioxide is attached to the surface of the inorganic particles. Alternatively, a solution of the hydrophobizing agent in an effective solvent may be applied (for example by spraying or coating) to the surface of the inorganic particles in the air so that the hydrophobizing agent will adhere to the surface of the inorganic particles, or a solution of the hydrophobizing agent in an effective solvent may be added to a dispersion of the inorganic particles and maintained, and then the mixture of the solution and the dispersion of the inorganic particles may be dried, all in the air.

The inorganic particles content of the resin coating layer including the aggregates of inorganic particles may be, for further reduced gloss unevenness, 10% by mass or more and 65% by mass or less of the total mass of the resin coating layer. Preferably, this percentage is 15% by mass or more and 60% by mass or less, more preferably 20% by mass or more and 45% by mass or less, even more preferably 20% by mass or more and 35% by mass or less.

The arithmetic mean diameter of the aggregates of inorganic particles divided by the average thickness of the resin coating layer may be 0.005 or greater or 0.5 or smaller for further reduced gloss unevenness. Preferably, this quotient is 0.01 or greater and 0.3 or smaller, more preferably 0.05 or greater and 0.2 or smaller.

The arithmetic mean diameter of the aggregates of inorganic particles divided by the volume-average diameter of particles of the carrier may be 0.001 or greater and 0.05 or smaller for further reduced gloss unevenness.

Preferably, this quotient is 0.002 or greater and 0.03 or smaller, more preferably 0.003 or greater and 0.01 or smaller.

The percentage of the aggregates of inorganic particles to all inorganic particles in the resin coating layer may be 50% by number or more and 99% by number or less for further reduced gloss unevenness. Preferably, this percentage is 50% by number or more and 90% by number or less, more preferably 70% by number of more and 90% by number or less.

The resin coating layer may contain at least one binder polymer, preferably at least one binder polymer and resin particles, for mechanical strength reasons and for further reduced gloss unevenness.

Examples of binder polymers include styrene-acrylic resins; polyolefin resins, such as polyethylene and polypropylene; polyvinyl or polyvinylidene resins, such as polystyrene, acrylic resins, polyacrylonitrile, polyvinyl acetate, polyvinyl alcohol, polyvinyl butyral, polyvinyl chloride, polyvinylcarbazole, polyvinyl ethers, and polyvinyl ketones; vinyl chloride-vinyl acetate copolymers; straight silicone resins, formed by organosiloxane bonds, and their modified forms; fluoropolymers, such as polytetrafluoroethylene, polyvinyl fluoride, polyvinylidene fluoride, and polychlorotrifluoroethylene; polyesters; polyurethanes; polycarbonates; amino resins, such as urea-formaldehyde resins; and epoxy resins.

Styrene-acrylic binder polymers may adhere well to the magnetic particles (ferrite particles in particular).

Examples of monomers that can be polymerized into a styrene-acrylic resin include lower alkyl esters of (meth) acrylic acid (e.g., C1 to C9 alkyl (meth)acrylates), specifically methyl (meth)acrylate, ethyl (meth)acrylate, propyl (meth)acrylate, butyl (meth)acrylate, hexyl (meth)acrylate, cyclohexyl (meth)acrylate, and 2-ethylhexyl (meth)acrylate. One such monomer may be used, or two or more may be used in combination.

The percentage of styrene-acrylic resins to all binder polymers may be 80% by mass or more, preferably 90% by mass or more. It may be that substantially all binder polymers are styrene-acrylic resins.

The resin coating layer may contain resin particles, for example for the purpose of increasing the mechanical strength of the layer. The resin particles are an element different from the binder polymer in the resin coating layer and are observed as particles inside the resin coating layer in a cross-sectional image of the carrier.

Examples of resin particles include particles of a crosslinking resin and particles of a thermosetting resin.

Examples of crosslinking resins include crosslinking styrene-acrylic resins.

Examples of thermosetting resins include melamine, urea, urethane, guanamine, and amide resins.

The resin particles content of the resin coating layer may be, for mechanical strength reasons, 0.01 parts by mass or more and 10 parts by mass or less per 100 parts by mass of the magnetic particles. Preferably, the resin particles content is 0.05 parts by mass or more and 5 parts by mass or less, more preferably 0.1% by mass or more and 3% by mass or less, even more preferably 0.1% by mass or more and 1% by mass or less.

The resin coating layer may contain electrically conductive particles for the control of the charge or resistance of the carrier. Examples of electrically conductive particles include particles of carbon black; metals, such as gold, silver, and copper; metal compounds, such as barium sulfate, aluminum borate, potassium titanate, titanium oxide, zinc oxide, tin oxide, antimony-doped tin oxide, tin-doped indium oxide, and aluminum-doped zinc oxide; and metal-coated resin particles.

The amount of electrically conductive particles added to the resin coating layer may be, for chargeability reasons, 0.01 parts by mass or more and 10 parts by mass or less per 100 parts by mass of the magnetic particles. Preferably, the amount of the electrically conductive particles is 0.05 parts by mass or more and 5 parts by mass or less, more preferably 0.1% by mass or more and 3% by mass or less, even more preferably 0.1% by mass or more and 1% by mass or less.

The amount of the resin coating layer may be, for further reduced gloss unevenness, 1 part by mass or more and 10 parts by mass or less per 100 parts by mass of the magnetic particles. Preferably, the amount of the resin coating layer is 1.5 parts by mass or more and 8 parts by mass or less, more preferably 2 parts by mass or more and 5 parts by mass or less.

Magnetic Particles

The magnetic particles can be of any kind; known types of magnetic particles that can be used as a carrier core can be employed. Specific examples of magnetic particles include particles of magnetic metals, such as iron, nickel, and cobalt; particles of magnetic oxides, such as ferrite and magnetite; resin-impregnated magnetic particles, which are obtained by impregnating a porous magnetic powder with a resin; and magnetic powder-dispersed resin particles, which are particles of a resin with a magnetic powder dispersed therein.

In this exemplary embodiment, the magnetic particles may be ferrite particles for chargeability reasons.

The volume-average diameter of the magnetic particles may be 15 μm or more and 100 μm or less, preferably 20 μm or more and 80 μm or less, more preferably 30 μm or more and 60 μm or less.

As for the magnetism of the magnetic particles, the saturation magnetization in a magnetic field of 3000 Oersteds is, for example, 50 emu/g or more and may be 60 emu/g or more. This saturation magnetization is that measured using VSM P10-15 vibrating sample magnetometer (Toei Industry). The sample for measurement is packed in a 7-mm (inner diameter)×5-mm (height) cell, and this cell is set in the magnetometer. A magnetic field is applied, swept up to 3000 Oersteds, and then reduced while a hysteresis loop is drawn on chart paper. Data from the loop is used to determine the saturation magnetization, remanent magnetization, and coercivity.

The electrical volume resistance (volume resistivity) of the magnetic particles may be $1\times10^5$ Ω·cm or more and $1\times10^9$ Ω·cm or less, preferably $1\times10^7$ Ω·cm or more and $1\times10^9$ Ω·cm or less.

The electrical volume resistance (Ω·cm) of the magnetic particles is that measured as follows. On the surface of a round jig having 20-$cm^2$ plate electrodes, the analyte particles are spread to form a flat layer with a thickness of 1 mm or more and 3 mm or less. A 20-$cm^2$ plate electrode is placed on this layer to sandwich the layer between the electrodes. A load of 4 kg is placed on the upper electrode to eliminate any space between the analyte particles, and then the thickness of the layer (cm) is measured. The two electrodes, on and below the layer, have been connected to an electrometer and a high-voltage power supply. A high voltage is applied to the electrodes to produce an electric field of 103.8 V/cm, and the current reading (A) is recorded. The measurement is performed at a temperature of 20° C. and a relative humidity of 50%, and the electrical volume resistance (Ω·cm) of the analyte is calculated according to the following equation.

$$R=Ex20/(I-I_0)/L$$

In the equation, R represents the electrical volume resistance (Ω·cm) of the analyte, E represents the applied voltage (V), I represents electrical current (A), $I_0$ represents the electrical current (A) at an applied voltage of 0 V, and L represents the thickness (cm) of the layer. The coefficient 20 is the area ($cm^2$) of the plate electrodes.

Characteristics of the Carrier

The volume-average diameter of particles of the carrier according to this exemplary embodiment for developing an electrostatic charge image may be 15 μm or more and 120 μm or less, preferably 20 μm or more and 100 μm or less, more preferably 30 μm or more and 80 μm or less.

The volume-average diameter of the magnetic particles and that of particles of the carrier in this exemplary embodiment are those measured using LA-700 laser-diffraction particle size analyzer (HORIBA, Ltd.). Specifically, the size distribution measured using the analyzer is divided into segments by particle size (channels), and the cumulative distribution of volume is plotted starting from the smallest diameter. The particle diameter at which the cumulative volume is 50% is the volume-average diameter of the particles.

The amount of free resin in the carrier according to this exemplary embodiment for developing an electrostatic charge image may be 200 ppm or less so that the color(s) of the resulting image will not be dull. Preferably, the amount of free resin is 100 ppm or less, more preferably 75 ppm or less.

In this exemplary embodiment, the amount of free resin in the carrier for developing an electrostatic charge image is that measured as follows.

A certain weighed amount of the carrier is dispersed in water, and the resulting dispersion is filtered with the carrier immobilized using a magnet. The filter is dried, and the amount of free resin is calculated from the difference in the mass of the filter between before and after the filtration and the measured mass of the carrier according to the formula below.

The amount of free resin (ppm)=the gain in the mass of the filter (g)/the measured mass of the carrier (g)

The percentage of aggregates in the carrier according to this exemplary embodiment for developing an electrostatic charge image after sieving through a 75-μm filter may be 5% by number or less so that the color(s) of the resulting image will not be dull. Preferably, this percentage is 1% by number or less, more preferably 0.1% by number or less, even more preferably 0.01% by number or less.

The percentage of aggregates in the carrier for developing an electrostatic charge image after sieving through a 75-μm filter in this exemplary embodiment is that determined as follows.

The carrier is sieved through a 75-μm mesh filter, and the sieved carrier is spread as thinly as possible. The spread layer is imaged using a scanning electron microscope (SEM) at a magnification of 350 times. The percentage of carrier particles excluding primary particles to all carrier particles in the same field of view is calculated.

The flow rate of the carrier for developing an electrostatic charge image in this exemplary embodiment may be 20 seconds/50 g or more and 50 seconds/50 g or less so that the density of toner, for example, will not vary from place to place on the resulting image. Preferably, the flow rate of the carrier is 22 seconds/50 g or more and 35 seconds/50 g or less, more preferably 25 seconds/50 g or more and 30 seconds/50 g or less.

The flow rate of the carrier for developing an electrostatic charge image in this exemplary embodiment is that measured according to JIS 22502 (2020) at 25° C. and 50% RH.

Production of the Carrier for Developing an Electrostatic Charge Image

A carrier according to the above exemplary embodiment for developing an electrostatic charge image can be produced by any method. A possible method, however, may include forming the resin coating layer through a dry process by mixing the magnetic particles, the inorganic particles, and a binder polymer together using a stirrer-mixer.

The stirrer-mixer can be a known one, and a typical example is a Henschel mixer. With a Henschel mixer, it may be easy to make the arithmetic mean diameter of the aggregates of inorganic particles in the resin coating layer 30 nm or more and 150 nm or less and make the percentage exposure of the magnetic particles 5% or less at the same time.

A method according to an exemplary embodiment for producing a carrier for developing an electrostatic charge image may be one that includes dry-attaching resin particles and inorganic particles to the surface of magnetic particles inside a stirrer-mixer, the resin particles being a precursor to a binder polymer in a resin coating layer (attachment); and mixing the magnetic particles, with the resin particles and the inorganic particles adhering thereto, inside the stirrer-mixer while heating them to a temperature at which the resin particles melt (heating and mixing).

The following describes this production method in detail.

Attachment

Inside a stirrer-mixer, resin particles as a precursor to a binder polymer in a resin coating layer (hereinafter "first resin particles") and inorganic particles are dry-attached to the surface of magnetic particles. The term "dry" means the resin is not dissolved or dispersed in a solvent.

The attachment may include stirring and mixing the materials together inside the stirrer-mixer.

The first resin particles will melt into a binder polymer in the resin coating layer during the heating and mixing. The term "melt" in this context means the first resin particles fuse together, losing their shape. The first resin particles, therefore, are resin particles that will lose their shape during the heating and mixing by virtue of their thermal characteristics.

The first resin particles and other material(s) may be added to the stirrer-mixer at once or may be added in two or more divided portions.

Any resin particles different from the base polymer (hereinafter "second resin particles") that will be in the resin coating layer of the finished carrier are also attached to the magnetic particles. The second resin particles are resin particles that will not melt, and therefore maintain their shape, during the heating and mixing.

Any electrically conductive particles that will be in the resin coating layer of the finished carrier are also attached to the magnetic particles.

The first resin particles and other material(s) may be attached to the surface of the magnetic particles by mechanical stirring. A specific example is to put the materials into the stirrer-mixer and stir them. The inside of the stirrer-mixer is at a temperature at which the first resin particles do not melt (i.e., a temperature at which the first resin particles maintain their shape).

In the attachment, the materials may be mixed at a temperature lower than in the heating and mixing. The mixing temperature may be 0° C. or above and 80° C. or below, preferably 10° C. or above and 50° C. or below, although it is also dictated by parameters such as the melting temperature of the resin particles used.

The duration of mixing in the attachment is not critical. It may be 0.1 minutes or more and 120 minutes or less, preferably 1 minute or more and 60 minutes or less.

Heating and Mixing

Inside the stirrer-mixer, the magnetic particles with at least the first resin particles and the inorganic particles adhering thereto are mixed while being heated to a temperature at which the first resin particles melt. The term "melt" in this context means the first resin particles fuse together, losing their shape. Through the heating and mixing, the first resin particles melt and become pressed into the microscopic texture on the surface of the magnetic particles together with the inorganic particles, forming a highly adhesive resin coating layer.

The stirrer-mixer may have a temperature control structure capable of heating and cooling and stirring blade(s).

The temperature control structure can be of any kind. An example is a jacket structure.

The shape of the stirring blade(s) is not critical. Examples include Banbury, sigma-shaped, Z-shaped, spiral, and fishtail blades.

The diameter D of the stirring blade(s) is not critical either; the blade(s) can be in any size permitted by the stirrer-mixer used. Rotating stirring blade(s) passes a portion of planes perpendicular to the axis of rotation of the blade(s), and the diameter D of the stirring blade(s) in this exemplary embodiment refers to the maximum outer diameter of that portion.

The circumferential velocity of the stirring blade(s) may be 0.1 m/sec or more and 100 m/sec or less for faster production of the carrier and for further reduced gloss unevenness. Preferably, this circumferential velocity is 1 m/sec or more and 50 m/sec or less, more preferably 2 m/sec or more and 30 m/sec or less.

The clearance between the stirring vessel and the stirring blade(s) in the stirrer-mixer is not critical either; any clearance permitted by the mixer can be used. A wide clearance, however, can cause the carrier near the vessel bottom not to be crushed completely, and the efficiency of crushing is dictated not only by the aforementioned circumferential velocity and the power of the stirring blade(s) but also by the shear force, which is a function of the clearance. A narrow clearance may help, but due to limitations in the production of the stirrer-mixer, the clearance cannot be infinitely small. The clearance between the outer circumference of the stirring blade(s) and the stirring vessel, therefore, may be 5% or less, preferably 3.5% or less, as a percentage to the diameter of the blade(s).

The stirring with the stirring blade(s) may be continued during the mixing.

In the heating and mixing, the materials may be heated to a temperature equal to or higher than the melting temperature of the first resin particles, preferably the melting temperature of the first resin particles plus 20° C. or more. The heating temperature may be 80° C. or above and 200° C. or below, preferably 100° C. or above and 180° C. or below, more preferably 120° C. or above and 180° C. or below, although it is also dictated by parameters such as the melting temperature of the resin particles used.

The duration of mixing in the heating and mixing is not critical. It may be 0.1 minutes or more and 120 minutes or less, preferably 1 minute or more and 60 minutes or less.

Crushing and Cooling

After the heating and mixing, the method according to this exemplary embodiment for producing a carrier for developing an electrostatic charge image may include crushing and cooling, in which the heated and mixed particles are cooled while being crushed. In the crushing and cooling, the heated and mixed particles are cooled while being crushed into primary particles of the carrier.

Proactive cooling is unnecessary; the mixture only needs to be crushed at room temperature (e.g., an atmosphere between 5° C. and 35° C.). It is, furthermore, not critical how to crush the mixture; a known mixer or mill can be used.

After the mixing or the crushing and cooling, the method according to this exemplary embodiment for producing a carrier for developing an electrostatic charge image may include classifying or sieving the particles. It is not critical how to classify or sieve the particles; a known classifier or sieve can be used.

Besides the foregoing, the method according to this exemplary embodiment for producing a carrier for developing an electrostatic charge image may further include, for example, preparing resin particles.

Electrostatic Charge Image Developer

A developer according to an exemplary embodiment contains toner and a carrier according to the above exemplary embodiment.

The developer according to this exemplary embodiment is one prepared by mixing appropriate proportions of toner and a carrier according to the above exemplary embodiment. The mix ratio (by mass) between the toner and the carrier may be between 1:100 (toner:carrier) and 30:100, preferably between 3:100 and 20:100.

Toner for Developing an Electrostatic Charge Image

The toner can be of any kind and can be a known one. An example is a colored toner including toner particles that contain binder resin(s) and coloring agent(s). An infrared-absorbing toner, made with infrared absorber(s) instead of coloring agent(s), may also be used. The toner may contain ingredients like a release agent and internal or external additives.

Binder Resin(s)

Examples of binder resins include vinyl resins that are homopolymers of monomers such as styrenes (e.g., styrene, para-chlorostyrene, and α-methylstyrene), (meth)acrylates (e.g., methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, and 2-ethylhexyl methacrylate), ethylenically unsaturated nitriles (e.g., acrylonitrile and methacrylonitrile), vinyl ethers (e.g., vinyl methyl ether and vinyl isobutyl ether), vinyl ketones (e.g., vinyl methyl ketone, vinyl ethyl ketone, and vinyl isopropenyl ketone), and olefins (e.g., ethylene, propylene, and butadiene) and copolymers of two or more such monomers.

Non-vinyl resins, such as epoxy resins, polyester resins, polyurethane resins, polyamide resins, cellulose resins, polyether resins, and modified rosin, mixtures of any such resin and vinyl resin(s), and graft copolymers obtained by polymerizing a vinyl monomer in the presence of any such non-vinyl resin may also be used.

One such binder resin may be used alone, or two or more may be used in combination.

A binder resin may be, for example, a polyester resin. Examples of polyester resins include known ones.

The glass transition temperature (Tg) of the polyester resin may be 50° C. or above and 80° C. or below, preferably 50° C. or above and 65° C. or below.

The glass transition temperature is that determined from the DSC curve of the resin, which is measured by differential scanning calorimetry (DSC). More specifically, the glass transition temperature is the "extrapolated initial temperature of glass transition" as in the methods for determining glass transition temperatures set forth in JIS K7121-1987 "Testing Methods for Transition Temperatures of Plastics."

The weight-average molecular weight (Mw) of the polyester resin may be 5000 or more and 1000000 or less, preferably 7000 or more and 500000 or less. The number-average molecular weight (Mn) of the polyester resin may be 2000 or more and 100000 or less. The molecular weight distribution, Mw/Mn, of the polyester resin may be 1.5 or more and 100 or less, preferably 2 or more and 60 or less.

The weight- and number-average molecular weights are those measured by gel permeation chromatography (GPC). The molecular weight measurement by GPC uses Tosoh's HLC-8120 GPC chromatograph with Tosoh's TSKgel SuperHM-M column (15 cm) and THF eluate. A molecular-weight calibration curve constructed using monodisperse polystyrene standards is used to calculate the weight- and number-average molecular weights.

The binder resin content may be 40% by mass or more and 95% by mass or less, preferably 50% by mass or more and 90% by mass or less, more preferably 60% by mass or more and 85% by mass or less of the toner particles as a whole.

Coloring Agent(s)

Examples of coloring agents include pigments, such as carbon black, chrome yellow, Hansa yellow, benzidine yellow, threne yellow, quinoline yellow, pigment yellow, permanent orange GTR, pyrazolone orange, Vulcan orange, Watchung red, permanent red, brilliant carmine 3B, brilliant carmine 6B, DuPont oil red, pyrazolone red, lithol red, rhodamine B lake, lake red C, pigment red, rose bengal, aniline blue, ultramarine blue, Calco oil blue, methylene blue chloride, phthalocyanine blue, pigment blue, phthalocyanine green, and malachite green oxalate; and dyes, such as acridine, xanthene, azo, benzoquinone, azine, anthraquinone, thioindigo, dioxazine, thiazine, azomethine, indigo, phthalocyanine, aniline black, polymethine, triphenylmethane, diphenylmethane, and thiazole dyes.

One coloring agent may be used alone, or two or more may be used in combination.

Surface-treated coloring agents may optionally be used, and a combination of a coloring agent and a dispersant may also be used. It is also possible to use multiple coloring agents in combination.

The coloring agent content may be 1% by mass or more and 30% by mass or less, preferably 3% by mass or more and 15% by mass or less, of the toner particles as a whole.

Release Agent

Examples of release agents include hydrocarbon waxes; natural waxes, such as carnauba, rice, and candelilla waxes; synthesized or mineral/petroleum waxes, such as montan wax; and ester waxes, such as fatty acid esters and montanates. Other release agents may also be used.

The melting temperature of the release agent may be 50° C. or above and 110° C. or below, preferably 60° C. or above and 100° C. or below.

The melting temperature is the "peak melting temperature" as in the methods for determining melting temperatures set forth in JIS K7121-1987 "Testing Methods for Transition Temperatures of Plastics" and is determined from the DSC curve, measured by differential scanning calorimetry (DSC).

The release agent content may be 1% by mass or more and 20% by mass or less, preferably 5% by mass or more and 15% by mass or less, of the toner particles as a whole.

Other Additives

Examples of other additives include known additives, such as magnetic substances, charge control agents, and inorganic powders. Such additives are contained in the toner particles as internal additives.

Characteristics and Other Details of the Toner Particles

The toner particles may be single-layer ones or may be "core-shell" ones, i.e., toner particles formed by a core (core particle) and a resin coating that covers the core (shell layer). Core-shell toner particles may be formed by, for example, a core that contains the binder resin(s) and optionally additives, such as coloring agent(s) and a release agent, and a resin coating that contains the binder resin(s).

The volume-average diameter (D50v) of the toner particles may be 2 μm or more and 10 μm or less, preferably 4 μm or more and 8 μm or less.

The volume-average diameter (D50v) of the toner particles is that measured using Coulter Multisizer II (Beckman Coulter) and ISOTON-II electrolyte (Beckman Coulter). The measurement starts with adding a sample weighing 0.5 mg or more and 50 mg or less to 2 ml of a 5% by mass aqueous solution of a surfactant (e.g., a sodium alkylbenzene sulfonate), which will serve as a dispersant. The resulting dispersion is added to 100 ml or more and 150 ml or less of the electrolyte. The electrolyte with the suspended sample therein is sonicated for 1 minute using a sonicator, and the size distribution of particles having a diameter of 2 μm or more and 60 μm or less is measured using Coulter Multisizer II with an aperture size of 100 μm. The number of particles sampled is 50000.

External Additives

An example of an external additive is inorganic particles. Examples of inorganic particles include particles of $SiO_2$, $TiO_2$, $Al_2O_3$, CuO, ZnO, $SnO_2$, $CeO_2$, $Fe_2O_3$, MgO, BaO, CaO, $K_2O$, $Na_2O$, $ZrO_2$, $CaO{\cdot}SiO_2$, $K_2O{\cdot}(TiO_2)n$, $Al_2O_3{\cdot}2SiO_2$, $CaCO_3$, $MgCO_3$, $BaSO_4$, and $MgSO_4$.

The surface of inorganic particles used as an external additive may have been rendered hydrophobic. The hydrophobic treatment is done by, for example, immersing the inorganic particles in hydrophobizing agent(s). The hydrophobizing agent(s) can be of any kind, but examples include silane coupling agents, silicone oil, titanate coupling agents, and aluminum coupling agents. One such agent may be used alone, or two or more may be used in combination.

The amount of the hydrophobizing agent(s) is usually, for example, 1 part by mass or more and 10 parts by mass or less per 100 parts by mass of the inorganic particles.

Materials like resin particles (particles of polystyrene, polymethyl methacrylate, melamine resins, etc.) and active cleaning agents (e.g., metal salts of higher fatty acids, typically zinc stearate, and particles of fluoropolymers) are also examples of external additives.

The amount of the external additive(s) may be 0.01% by mass or more and 5% by mass or less, preferably 0.01% by mass or more and 2.0% by mass or less, of the toner particles.

Production of the Toner

The toner can be obtained by producing the toner particles and then adding external additive(s) to the toner particles. The production of the toner particles can be either by a dry process (e.g., kneading and milling) or by a wet process (e.g., aggregation and coalescence, suspension polymerization, or dissolution and suspension). Any known dry or wet process may be used. Aggregation and coalescence, in particular, may be used to produce the toner particles.

Image Forming Apparatus and Image Forming Method

An image forming apparatus according to an exemplary embodiment includes an image carrier; a charging component that charges the surface of the image carrier; an electrostatic charge image creating component that forms an electrostatic charge image on the charged surface of the image carrier; a developing component that contains an electrostatic charge image developer and develops, using the electrostatic charge developer, the electrostatic charge image on the surface of the image carrier to form a toner image; a transfer component that transfers the toner image on the surface of the image carrier to the surface of a recording medium; and a fixing component that fixes the toner image on the surface of the recording medium. The electrostatic charge image developer is an electrostatic charge developer according to the above exemplary embodiment.

The image forming apparatus according to this exemplary embodiment performs an image forming method that includes charging the surface of an image carrier; creating an electrostatic charge image on the charged surface of the image carrier; developing, using an electrostatic charge image developer according to the above exemplary embodiment, the electrostatic charge image on the surface of the image carrier to form a toner image; transferring the toner image on the surface of the image carrier to the surface of a recording medium; and fixing the toner image on the surface of the recording medium (image forming method according to an exemplary embodiment).

The configuration of the image forming apparatus according to this exemplary embodiment can be applied to known types of image forming apparatuses, including a direct-transfer image forming apparatus, which forms a toner image on the surface of an image carrier and transfers it directly to a recording medium; an intermediate-transfer image forming apparatus, which forms a toner image on the surface of an image carrier, transfers it to the surface of an intermediate transfer body (first transfer), and then transfers the toner image on the surface of the intermediate transfer body to the surface of a recording medium (second transfer); an image forming apparatus having a cleaning component that cleans the surface of the image carrier between the transfer of the toner image and charging; and an image forming apparatus having a static eliminator that removes static electricity from the surface of the image carrier by irradiating the surface with antistatic light between the transfer of the toner image and charging.

If the image forming apparatus according to this exemplary embodiment is an intermediate-transfer one, its transfer component may include, for example, an intermediate transfer body, the surface of which is for the toner image to be transferred to; a first transfer component, which transfers the toner image formed on the image carrier to the surface of the intermediate transfer body (first transfer); and a second transfer component, which transfers the toner image on the surface of the intermediate transfer body to the surface of the recording medium (second transfer).

Part of the image forming apparatus according to this exemplary embodiment, e.g., a portion including the developing component, may have a cartridge structure, i.e., a structure that allows the part to be detached from and attached to the image forming apparatus (or may be a process cartridge). An example of a process cartridge is one that includes a developing component that contains an electrostatic charge image developer according to the above exemplary embodiment.

The following describes an example of an image forming apparatus according to this exemplary embodiment, although this is not the only possible form. Some of its structural elements are described with reference to a drawing.

FIG. 1 is a schematic diagram illustrating the structure of an image forming apparatus according to this exemplary embodiment.

The image forming apparatus illustrated in FIG. 1 includes first to fourth electrophotographic image forming units 10Y, 10M, 10C, and 10K (image forming component) that produce images in the colors of yellow (Y), magenta (M), cyan (C), and black (K), respectively, based on color-separated image data. These image forming units (hereinafter also referred to simply as "units") 10Y, 10M, 10C, and 10K are arranged in a horizontal row with a predetermined distance therebetween. The units 10Y, 10M, 10C, and 10K may be process cartridges, i.e., units that can be detached from and attached to the image forming apparatus.

Above the units 10Y, 10M, 10C, and 10K, an intermediate transfer belt (example of an intermediate transfer body) 20 extends, passing through each unit. The intermediate transfer belt 20 is wound over a drive roller 22 and a support roller 24 and runs in the direction from the first unit 10Y to the fourth unit 10K. The support roller 24 is forced by a spring or similar mechanism, not illustrated in the drawing, to go away from the drive roller 22, thereby placing tension on the intermediate transfer belt 20 wound over the two rollers. On the image-carrying side of the intermediate transfer belt 20 is a cleaning device 30 for the intermediate transfer belt 20 facing the drive roller 22.

The units 10Y, 10M, 10C, and 10K have developing devices (example of a developing component) 4Y, 4M, 4C, and 4K, to which yellow, magenta, cyan, and black toners, respectively, are fed from toner cartridges 8Y, 8M, 8C, and 8K.

The first to fourth units 10Y, 10M, 10C, and 10K are equivalent in structure and operation. The following, therefore, describes the first one 10Y, located upstream of the others in the direction of running of the intermediate transfer belt 20 and producing a yellow image, on behalf of the four.

The first unit 10Y has a photoreceptor 1Y that acts as an image carrier. Around the photoreceptor 1Y are a charging roller (example of a charging component) 2Y that charges the surface of the photoreceptor 1Y to a predetermined potential; an exposure device (example of an electrostatic charge image creating component) 3 that irradiates the charged surface with a laser beam 3Y generated on the basis of a color-separated image signal to form an electrostatic charge image there; a developing device (example of a developing component) 4Y that feeds charged toner to the electrostatic charge image to develop the electrostatic charge image; a first transfer roller (example of a first transfer component) 5Y that transfers the developed toner image to the intermediate transfer belt 20; and a photoreceptor cleaning device (example of a cleaning component) 6Y that removes residual toner off the surface of the photoreceptor 1Y after the first transfer, arranged in this order.

The first transfer roller 5Y is inside the intermediate transfer belt 20 and faces the photoreceptor 1Y. The first transfer roller 5Y, 5M, 5C, or 5K of each unit is connected to a bias power supply (not illustrated) that applies a first transfer bias to the roller. Each bias power supply is controlled by a controller, not illustrated in the drawing, to change the value of the transfer bias it applies to the corresponding first transfer roller.

The formation of a yellow image at the first unit 10Y may be as described below.

First, before the image formation, the charging roller 2Y charges the surface of the photoreceptor 1Y to a potential of −600 V to −800 V.

The photoreceptor 1Y is a stack of an electrically conductive substrate (e.g., having a volume resistivity at 20° C. of $1\times10^{-6}$ Ω·cm or less) and a photosensitive layer thereon. The photosensitive layer is of high electrical resistance (has the typical resistance of resin) in its normal state, but when it is irradiated with a laser beam, the resistivity of the irradiated portion changes. Thus, a laser beam 3Y is emitted from the exposure device 3 onto the charged surface of the photoreceptor 1Y according to data for the yellow image sent from a controller, not illustrated in the drawing. This will form an electrostatic charge image as a pattern for the yellow image on the surface of the photoreceptor 1Y.

The electrostatic charge image is an image formed on the surface of the photoreceptor 1Y by electrical charging and is a so-called negative latent image; it is formed as a result of the charge on the surface of the photoreceptor 1Y flowing away in the irradiated portion of the photosensitive layer in response to a resistivity decrease caused by the exposure to the laser beam 3Y while staying in the portion of the photosensitive layer not irradiated with the laser beam 3Y.

The electrostatic charge image formed on the photoreceptor 1Y moves to a predetermined development point as the photoreceptor 1Y rotates. At this development point, the electrostatic charge image on the photoreceptor 1Y is developed into a toner image, or visualized, by the developing device 4Y.

Inside the developing device 4Y is an electrostatic charge image developer that contains, for example, at least yellow toner and a carrier. The yellow toner is on a developer roller (example of a developer carrier) and has been triboelectrically charged with the same polarity as the charge on the photoreceptor 1Y (negative) as a result of being stirred inside the developing device 4Y. As the surface of the photoreceptor 1Y passes through the developing device 4Y, the yellow toner electrostatically adheres to the uncharged, latent-image area of the surface of the photoreceptor 1Y and develops the latent image. The photoreceptor 1Y, now having a yellow toner image thereon, then continues rotating at a predetermined speed, transporting the toner image developed thereon to a predetermined first transfer point.

After the arrival of the yellow toner image on the photoreceptor 1Y at the first transfer point, a first transfer bias is applied to the first transfer roller 5Y, and an electrostatic force acts on the toner image in the direction from the photoreceptor 1Y toward the first transfer roller 5Y to cause the toner image to be transferred from the photoreceptor 1Y to the intermediate transfer belt 20. The applied transfer bias has the (+) polarity, opposite the polarity of the toner (−), and its amount has been controlled by a controller (not illustrated). For example, for the first unit 10Y, it has been controlled to +10 μA.

Residual toner on the photoreceptor 1Y is removed and collected at the photoreceptor cleaning device 6Y.

The first transfer biases applied to the first transfer rollers 5M, 5C, and 5K of the second, third, and fourth units 10M, 10C, and 10K have also been controlled in the same way as that at the first unit 10Y.

The intermediate transfer belt 20 to which a yellow toner image has been transferred at the first unit 10Y in this way is then transported passing through the second to fourth units 10M, 10C, and 10K sequentially, and toner images in the respective colors are overlaid to complete multilayer transfer.

The intermediate transfer belt 20 that has passed through the first to fourth units and thereby completed multilayer transfer of toner images in four colors then reaches a second transfer section formed by the intermediate transfer belt 20, the support roller 24, which touches the inner surface of the intermediate transfer belt 20, and a second transfer roller (example of a second transfer component) 26, which is on the image-carrying side of the intermediate transfer belt 20. Recording paper (example of a recording medium) P is fed to the point of contact between the second transfer roller 26 and the intermediate transfer belt 20 in a timed manner by a feeding mechanism, and a second transfer bias is applied to the support roller 24. The applied transfer bias has the (−) polarity, the same as the polarity of the toner (−), and an electrostatic force acts on the toner image in the direction from the intermediate transfer belt 20 toward the recording paper P to cause the toner image to be transferred from the intermediate transfer belt 20 to the recording paper P. The amount of the second transfer bias has been controlled and is determined according to resistance detected by a resistance detector (not illustrated) that detects the electrical resistance of the second transfer section.

After that, the recording paper P is delivered to the point of pressure contact (nip) between a pair of fixing rollers at a fixing device (example of a fixing component) 28, and the toner image is fixed on the recording paper P there to give a fixed image.

The recording paper P to which the toner image is transferred can be, for example, ordinary printing paper for copiers, printers, etc., of electrophotographic type. Recording media such as overhead-projector (OHP) sheets may also be used.

The use of recording paper P having a smooth surface may help further improve the smoothness of the surface of the fixed image. For example, coated paper, which is paper with a resin or other coating on its surface, or art paper for printing may be used.

The recording paper P with a completely fixed color image thereon is transported to an ejection section to finish the formation of a color image.

Process Cartridge

A process cartridge according to an exemplary embodiment is one attachable to and detachable from an image forming apparatus and includes a developing component that contains an electrostatic charge image developer according to the above exemplary embodiment and develops, using the electrostatic charge image developer, an electrostatic charge image formed on the surface of an image carrier to form a toner image.

This is not the only possible configuration of a process cartridge according to this exemplary embodiment. The process cartridge may optionally have at least one extra component selected from an image carrier, a charging component, an electrostatic charge image creating component, a transfer component, etc., besides the developing component.

The following describes an example of a process cartridge according to this exemplary embodiment, although this is not the only possible form. Some of its structural elements are described with reference to a drawing.

Figure 2:
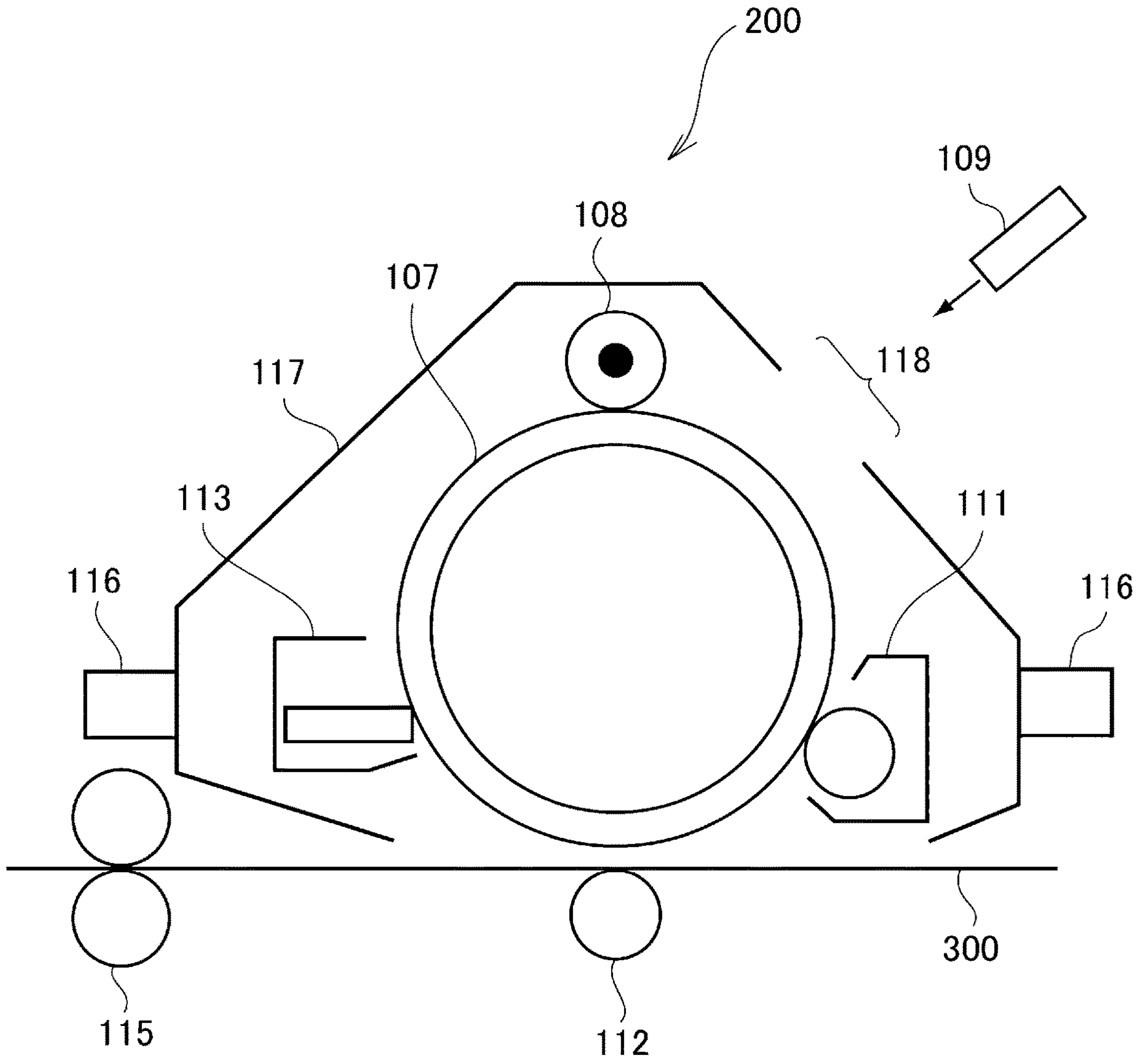
FIG. 2 is a schematic diagram illustrating the structure of an example of a process cartridge, according to an exemplary embodiment, attachable to and detachable from an image forming apparatus.

FIG. 2 is a schematic diagram illustrating the structure of a process cartridge according to this exemplary embodiment.

The process cartridge 200 illustrated in FIG. 2 is a cartridge containing, for example, a photoreceptor 107 (example of an image carrier) and a charging roller 108 (example of a charging component), a developing device 111 (example of a developing component), and a photoreceptor cleaning device 113 (example of a cleaning component) arranged around the photoreceptor 107, all held together in a housing 117 having attachment rails 116 and an opening 118 for exposure to light.

FIG. 2 also illustrates an exposure device (example of an electrostatic charge image creating component) 109, a transfer device (example of a transfer component) 112, a fixing device (example of a fixing component) 115, and recording paper (example of a recording medium) 300.

EXAMPLES

The following describes the above exemplary embodiments in more specific terms by providing examples, although these examples are not the only possible forms of the above exemplary embodiments. The syntheses, treatments, production, etc., are carried out at room temperature (25° C.±3° C.) unless stated otherwise. In the following description, "parts" and "%" are all by mass unless stated otherwise.

Production of Toners

Production of Amorphous Polyester Resin Dispersion (A1)

Ethylene glycol: 37 parts

Neopentyl glycol: 65 parts 1,9-Nonanediol: 32 parts

Terephthalic acid: 96 parts

These materials are put into a reactor and heated to a temperature of 200° C. over 1 hour. After the reaction system has been stirred to uniformity, 1.2 parts of dibutyltin oxide is added. The temperature is increased to 240° C. over 6 hours while water is removed by distillation while it is formed, and stirring is continued for 4 hours at 240° C. This gives an amorphous polyester resin (acid value, 9.4 mg KOH/g; weight-average molecular weight, 13,000; glass transition temperature, 62° C.). The molten amorphous polyester resin is transferred to an emulsifier-disperser (Cavitron CD1010, Eurotec) at a speed of 100 g per minute. Separately, reagent-grade aqueous ammonia is diluted with deionized water to a concentration of 0.37%. The resulting dilute aqueous ammonia is put into a tank and then, simultaneously with the amorphous polyester resin, transferred to the emulsifier-disperser at a speed of 0.1 liters per minute while being heated to 120° C. in a heat exchanger. The emulsifier-disperser is operated at a rotor frequency of 60 Hz and a pressure of 5 kg/cm$^2$. This gives amorphous polyester resin dispersion (A1), a liquid dispersion having a volume-average diameter of particles of 160 nm and a solids content of 20%.

Production of Crystalline Polyester Resin Dispersion (C1)

Decanedioic acid: 81 parts

Hexanediol: 47 parts

These materials are put into a reactor and heated to a temperature of 160° C. over 1 hour. After the reaction system has been stirred to uniformity, 0.03 parts of dibutyltin oxide is added. The temperature is increased to 200° C. over 6 hours while water is removed by distillation while it is formed, and stirring is continued for 4 hours at 200° C. Then the reaction solution is cooled until solids separate out, and the solids are collected and dried at a temperature of 40° C. under reduced pressure. This gives crystalline polyester resin (C1) (melting point, 64° C.; weight-average molecular weight, 15,000).

Crystalline polyester resin (C1): 50 parts

An anionic surfactant (DKS Co., Ltd., Neogen RK): 2 parts

Deionized water: 200 parts

These materials are heated to 120° C. and sufficiently dispersed using a homogenizer (ULTRA-TURRAX T50, IKA). The resulting dispersion is subjected to further dispersion using a pressure-pump homogenizer and collected when the volume-average diameter of particles is 180 nm. The resulting dispersion is crystalline polyester resin dispersion (C1), a liquid dispersion having a solids content of 20%.

Production of Release Agent Particles Dispersion (W1)

A paraffin wax (Nippon Seiro Co., Ltd., HNP-9): 100 parts

An anionic surfactant (DKS Co., Ltd., Neogen RK): 1 part

Deionized water: 350 parts

These materials are mixed together, and the resulting mixture is heated to 100° C. The mixture is dispersed using a homogenizer (IKA ULTRA-TURRAX T50) and then using a pressure-pump Gaulin homogenizer, giving a liquid dispersion in which release-agent particles having a volume-average diameter of 200 nm are dispersed. Deionized water is added to this liquid dispersion of release-agent particles to a solids content of 20%. The resulting dispersion is release agent particles dispersion (W1).

Production of Coloring Agent Particles Dispersion (C1)

A cyan pigment (Pigment Blue 15:3, Dainichiseika Color & Chemicals Mfg. Co., Ltd.): 50 parts An anionic surfactant (DKS Co., Ltd., Neogen RK): 5 parts Deionized water: 195 parts These materials are mixed together and dispersed for 60 minutes using a high-pressure impact disperser (Ultimaizer HJP30006, Sugino Machine). This gives coloring agent particles dispersion (C1), a liquid dispersion having a solids content of 20%.

Production of Coloring Agent Particles Dispersion (M1)

A magenta pigment (Pigment Red 122, DIC): 50 parts

An anionic surfactant (DKS Co., Ltd., Neogen RK): 5 parts

Deionized water: 195 parts

These materials are mixed together and dispersed for 60 minutes using a high-pressure impact disperser (Ultimaizer HJP30006, Sugino Machine). This gives coloring agent particles dispersion (M1), a liquid dispersion having a solids content of 20%.

Production of Coloring Agent Particles Dispersion (Y1)

A yellow pigment (Pigment Yellow 74, Dainichiseika Color & Chemicals Mfg. Co., Ltd.): 50 parts An anionic surfactant (DKS Co., Ltd., Neogen RK): 5 parts Deionized water: 195 parts These materials are mixed together and dispersed for 60 minutes using a high-pressure impact disperser (Ultimaizer HJP30006, Sugino Machine). This gives coloring agent particles dispersion (Y1), a liquid dispersion having a solids content of 20%.

Production of Cyan Toner Particles (C1)

Deionized water: 200 parts

Amorphous polyester resin dispersion (A1): 150 parts

Crystalline polyester resin dispersion (C1): 10 parts

Release agent particles dispersion (W1): 10 parts

Coloring agent particles dispersion (C1): 15 parts

An anionic surfactant (TaycaPower): 2.8 parts

These materials are put into a reactor, the pH is adjusted to 3.5 with 0.1 mol/L nitric acid, and then an aqueous solution of 2 parts of polyaluminum chloride (Oji Paper Co., Ltd.; 30% powder) in 30 parts of deionized water is added. The resulting mixture is dispersed at 30° C. using a homogenizer (IKA ULTRA-TURRAX T50), heated to 45° C. in an oil bath for heating, and maintained in that state until the volume-average diameter of particles is 4.9 μm. Then 60 parts of amorphous polyester resin dispersion (A1) is added, and the mixture is allowed to stand for 30 minutes. When the volume-average diameter of particles is 5.2 μm, another 60 parts of amorphous polyester resin liquid dispersion (A1) is added, and the mixture is allowed to stand for 30 minutes. Then 20 parts of a 10% aqueous solution of a metal salt of NTA (nitrilotriacetic acid) (CHELEST 70, Chelest Corporation) is added, and the pH is adjusted to 9.0 with a 1 mol/L aqueous solution of sodium hydroxide. The resulting mixture is heated to 85° C. with continued stirring with 1 part of the anionic surfactant (TaycaPower) and maintained in that state for 5 hours. The resulting mixture is cooled to 20° C. at a rate of 20° C./min and filtered, and the residue is washed thoroughly with deionized water and dried. This gives cyan toner particles (C1), having a volume-average diameter of 5.7 μm.

Production of Magenta Toner Particles (M1)

Magenta toner particles (M1) are produced in the same way as cyan toner particles (C1), except that coloring agent particles dispersion (C1) is changed to coloring agent particles dispersion (M1).

Production of Yellow Toner Particles (Y1)

Yellow toner particles (Y1) are produced in the same way as cyan toner particles (C1), except that coloring agent particles dispersion (C1) is changed to coloring agent particles dispersion (Y1).

Production of Cyan Toner (C1)

In a sample mill, 100 parts by mass of cyan toner particles (C1) and 1.5 parts by mass of hydrophobic silica particles (RY50, Nippon Aerosil) are mixed together for 30 seconds at a rotational frequency of 10,000 rpm. The resulting mixture is screened through a 45-μm mesh vibrating sieve. This gives cyan toner (C1), having a volume-average diameter of particles of 5.7 μm.

Production of Magenta Toner (M1)

Magenta toner (M1) is produced in the same way as cyan toner (C1), except that cyan toner particles (C1) are changed to magenta toner particles (M1).

Production of Yellow Toner (Y1)

Yellow toner (Y1) is produced in the same way as cyan toner (C1), except that cyan toner particles (C1) are changed to yellow toner particles (Y1).

Silica Particles (1)

HM20S (fumed silica particles, Tokuyama Corporation; volume-average diameter, 12 nm) is used as silica particles (1).

Example 1

A MnMg ferrite core (volume-average diameter of particles, 30 μm): 100 parts

Styrene/methyl methacrylate copolymer resin particles (ratio in the polymer by mass, 2/8; weight-average molecular weight, 500,000): 2.0 parts Silica particles (1): 1.0 part These materials are stirred and mixed together in a bladed stirrer-mixer for 15 minutes at a blade circumferential velocity of 10.0 m/sec and a stirrer-mixer internal temperature of 20° C. (attachment). This attaches the resin particles and the silica particles to the core.

The temperature inside the stirrer-mixer is set to 140° C., and the materials are stirred and mixed together for 15 minutes at a blade circumferential velocity of 5.0 m/s (heating and mixing).

The resulting powder is removed from the stirrer-mixer and screened through a 75-μm mesh sieve to eliminate coarse particles. This gives a carrier (for developing an electrostatic charge image).

Silica Particles (2)

Commercially available hydrophobic silica particles (fumed silica particles having a surface treated with hexamethyldisilazane; volume-average diameter, 40 nm) are used as silica particles (2).

Silica Particles (3)

Commercially available hydrophobic silica particles (fumed silica particles having a surface treated with hexamethyldisilazane; volume-average diameter, 90 nm) are used as silica particles (3).

Inorganic Particles (1)

Commercially available barium sulfate particles (BARIFINE BF-20, Sakai Chemical Industry Co., Ltd.; volume-average diameter, 30 nm) are used as inorganic particles (1).

Second Resin Particles

EPOSTAR FS melamine resin particles (Nippon Shokubai Co., Ltd.; average diameter of primary particles, 200 nm) are used as second resin particles.

Electrically Conductive Particles

Carbon black VXC72 (Cabot; average diameter of primary particles, 30 nm) is used as electrically conductive particles.

Examples 2, 3, 5, and 6 and Comparative Examples 4 and 5

A carrier is produced in the same way as in Example 1, except that the composition of the resin coating layer is changed as in Tables 1-1 and 1-2.

Example 4

A MnMg ferrite core (volume-average diameter of particles, 30 μm): 100 parts

Styrene/methyl methacrylate copolymer resin particles (ratio in the polymer by mass, 2/8; weight-average molecular weight, 500,000): 1.0 part These materials are stirred and mixed together in a bladed stirrer-mixer for 15 minutes at a blade circumferential velocity of 10.0 m/sec and a stirrer-mixer internal temperature of 20° C. (attachment). This attaches the resin particles to the core.

Styrene/methyl methacrylate copolymer resin particles (ratio in the polymer by mass, 2/8; weight-average molecular weight, 500,000): 1.0 part Silica particles (1): 1.0 part These materials are added to the bladed stirrer-mixer, and the contents are stirred and mixed together for 15 minutes at a blade circumferential velocity of 10.0 m/sec and a stirrer-mixer internal temperature of 20° C. (second attachment). This attaches the resin particles and the silica particles to the core.

The temperature inside the stirrer-mixer is set to 140° C., and the materials are stirred and mixed together for 15 minutes at a blade circumferential velocity of 5.0 m/s (heating and mixing).

The resulting powder is removed from the stirrer-mixer and screened through a 75-μm mesh sieve to eliminate coarse particles. This gives a carrier (for developing an electrostatic charge image).

Example 7

A MnMg ferrite core (volume-average diameter of particles, 30 μm): 100 parts

Styrene/methyl methacrylate copolymer resin particles (ratio in the polymer by mass, 2/8; weight-average molecular weight, 500,000): 2.0 parts Silica particles (1): 1.0 part These materials are stirred and mixed together in a bladed stirrer-mixer for 15 minutes at a blade circumferential velocity of 10.0 m/sec and a stirrer-mixer internal temperature of 20° C. (attachment). This attaches the resin particles and the silica particles to the core.

The temperature inside the stirrer-mixer is set to 160° C., and the materials are stirred and mixed together for 60 minutes at a blade circumferential velocity of 5.0 m/s (heating and mixing).

The resulting powder is removed from the stirrer-mixer and screened through a 75-μm mesh sieve to eliminate coarse particles. This gives a carrier (for developing an electrostatic charge image).

Example 8

A MnMg ferrite core (volume-average diameter of particles, 50 μm): 100 parts
Styrene/methyl methacrylate copolymer resin particles (ratio by in the polymer mass, 2/8; weight-average molecular weight, 500,000): 2.0 parts
Silica particles (1): 1.0 part These materials are stirred and mixed together in a bladed stirrer-mixer for 15 minutes at a blade circumferential velocity of 10.0 m/sec and a stirrer-mixer internal temperature of 20° C. (attachment). This attaches the resin particles and the silica particles to the core.

The temperature inside the stirrer-mixer is set to 140° C., and the materials are stirred and mixed together for 15 minutes at a blade circumferential velocity of 5.0 m/s (heating and mixing).

The resulting powder is removed from the stirrer-mixer and screened through a 75-μm mesh sieve to eliminate coarse particles. This gives a carrier (for developing an electrostatic charge image).

Comparative Example 1: With a Kneader

A MnMg ferrite core (volume-average diameter of particles, 30 μm): 100 parts
Styrene/methyl methacrylate copolymer resin particles (ratio in the polymer by mass, 2/8; weight-average molecular weight, 500,000): 2.0 parts
Silica particles (1): 1.0 part
Toluene: 5 parts Of these materials, the styrene/methyl methacrylate copolymer, silica particles (1), and toluene are stirred in a sand mill for 30 minutes at a rotational frequency of 1,200 rpm together with glass beads (diameter, 1 mm; the same amount as toluene) to give a solution. The resulting solution, for the formation of the resin coating layer, is put into a vacuum-degassing kneader together with the ferrite core, and the materials are stirred at 40 rpm with warming and pressure reduction over 30 minutes so that the toluene will be distilled away. This makes the ferrite core coated with the resin. The coated particles are removed from the kneader and screened through a 75-μm mesh sieve to eliminate coarse particles. This gives the carrier of Comparative Example 1.

Comparative Example 2: With a Spray Dryer

A MnMg ferrite core (volume-average diameter of particles, 30 μm): 100 parts
Styrene/methyl methacrylate copolymer resin particles (ratio in the polymer by mass, 2/8; weight-average molecular weight, 500,000): 2.0 parts
Silica particles (1): 1.0 part
Toluene: 10 parts Of these materials, the styrene/methyl methacrylate copolymer, silica particles (1), and toluene are put into a sand mill together with glass beads (diameter, 1 mm; the same amount as toluene) and made into a solution.

In a 70° C. atmosphere, the resulting solution, for the formation of the resin coating layer, is sprayed over the surface of the ferrite core using SPIRA COTA (a spray-dryer coater, Okada Seiko Co., Ltd.) at a rate of 30 g/min and dried. The target amount of the finished resin coating layer is 2.8 parts per 100 parts of the ferrite core. The dried powder is removed from the coater and crushed through a 75-μm mesh sieve. This gives the carrier of Comparative Example 2.

Comparative Example 3: With an Extruder

A MnMg ferrite core (volume-average diameter of particles, 30 μm): 100 parts
Styrene/methyl methacrylate copolymer resin particles (ratio in the polymer by mass, 2/8; weight-average molecular weight, 500,000): 2.0 parts
Silica particles (1): 1.0 part These materials are stirred and mixed together in a bladed stirrer-mixer for 15 minutes at a blade circumferential velocity of 10.0 m/sec and a stirrer-mixer internal temperature of 20° C. This attaches the resin particles and the silica particles to the core.

The core with the resin particles and the silica particles adhering thereto is fed continuously into the feedstock inlet of a continuous heater-processor (TEM50 continuous twin-screw extruder, Toshiba Machine Co., Ltd.). The processor's temperature for heating the casing is set to 250° C., and the resulting melt (approximately 190° C.) is collected at the outlet.

The collected melt is fed continuously to COMIL grinder (punched metal with a pore diameter of 1 mm), cooled while being crushed into primary particles, and collected as crushed particles at a temperature of 60° C. or below. The crushed particles are then screened through a 75-μm mesh sieve to eliminate coarse particles. This gives the carrier of Comparative Example 3.

Production of Electrostatic Charge Image Developers

Developers (electrostatic charge image developers) in the colors of cyan, magenta, and yellow are produced using the resulting carriers as follows.

One hundred parts of the carrier and 20 parts of cyan toner (C1) are stirred in a V-blender for 20 minutes. The resulting mixture is screened through a 212-μm sieve to complete a developer in the color of cyan.

One hundred parts of the carrier and 20 parts of magenta toner (M1) are stirred in a V-blender for 20 minutes. The resulting mixture is screened through a 212-μm sieve to complete a developer in the color of magenta.

One hundred parts of the carrier and 20 parts of yellow toner (Y1) are stirred in a V-blender for 20 minutes. The resulting mixture is screened through a 212-μm sieve to complete a developer in the color of yellow.

Arithmetic Mean Diameter of the Aggregates of Inorganic Particles

A portion of the carrier embedded in a piece of epoxy resin is sliced using a microtome to expose its cross-section. The cross-section is imaged with a scanning electron microscope (SEM) at a magnification of 10,000 times, and the size (maximum diameter) of aggregates is measured on the SEM image. The arithmetic mean of the measured diameters on 100 randomly captured images of the cross-section is reported as the arithmetic mean diameter of the aggregates.

Percentage Surface Exposure of the Magnetic Particles

A scanning electron microscope (SEM) image of the carrier surface at a magnification of 1,500 times is binarized. The proportion of the exposed area of the magnetic particles to the total area of the carrier on the SEM image is reported as the percentage surface exposure of the magnetic particles.

Cavity Width

A portion of the carrier embedded in a piece of epoxy resin is sliced using a microtome to expose its cross-section. The cross-section is imaged with a scanning electron microscope (SEM) at a magnification of 10,000 times, and the maximum cavity width at the interface between the carrier core and the coating layer is measured on the SEM image. The arithmetic mean of the measured widths on 100 randomly captured images of the cross-section is reported as the cavity width.

Si/C Ratio on the Carrier Surface

In this exemplary embodiment, the Si/C ratio on the carrier surface is that determined by x-ray photoelectron spectroscopy (XPS) as follows.

The elemental composition of the carrier surface is analyzed using JPS-9000MX analyzer (JEOL Ltd.) in Normal depth mode with an x-ray intensity of 10 kV/30 mA. The area of the peak for Si and that of the peak for C are measured, and the ratio is calculated from the measured areas.

Testing for the Reduction of Gloss Unevenness

A sample image with a 1% coverage chart is printed continuously on 100,000 sheets of A4-sized J paper (FUJIFILM Business Innovation Corp.) using "Iridesse Production Press" (FUJIFILM Business Innovation Corp.) under 28.5° C. and 85% RH conditions. After the printing on 100,000 sheets, a full-page solid sample image in a tertiary color (process black; cyan toner:magenta toner:yellow toner=1:1:1 (by mass)) is printed on one sheet of A4-sized "45" paper (Ricoh Co., Ltd.; grammage, 52 gsm) to a transferred mass per area (TMA) of 9.8 g/cm$^2$. Gloss unevenness of the printed image is graded by the difference in measured gloss (75-degree gloss meter) between two points as in the criteria below. The grade may be one of A to C.

A: The difference in gloss is 3% or less

B: The difference in gloss is more than 3% and 10% or less

C: The difference in gloss is more than 10% and 20% or less

D: The difference in gloss is more than 20% and 40% or less

E: The difference in gloss is more than 40%

TABLE 1-1

| | | | Resin coating layer composition (parts by mass) | | |
|---|---|---|---|---|---|
| | Equipment | Magnetic particles content (parts by mass) | First resin particles (styrene/methyl methacrylate resin particles) | Inorganic particles Species | Inorganic particles Amount |
| Example 1 | Henschel mixer | 100 | 2.0 | Silica particles (1) | 1.0 |
| Example 2 | Henschel mixer | 100 | 1.8 | Silica particles (1) | 1.7 |
| Example 3 | Henschel mixer | 100 | 1.5 | Silica particles (1) | 0.6 |
| Example 4 | Henschel mixer | 100 | 2.0 | Silica particles (1) | 1.0 |
| Example 5 | Henschel mixer | 100 | 2.0 | Inorganic particles (1) | 1.0 |
| Example 6 | Henschel mixer | 100 | 2.0 | Silica particles (2) | 1.0 |
| Example 7 | Henschel mixer | 100 | 2.0 | Silica particles (1) | 1.0 |
| Example 8 | Henschel mixer | 100 | 2.0 | Silica particles (1) | 1.0 |
| Comparative Example 1 | Kneader | 100 | 2.0 | Silica particles (1) | 1.0 |
| Comparative Example 2 | Spray dryer | 100 | 2.0 | Silica particles (1) | 1.0 |
| Comparative Example 3 | Twin-screw extruder | 100 | 2.0 | Silica particles (1) | 1.0 |
| Comparative Example 4 | Henschel mixer | 100 | 3.0 | — | — |
| Comparative Example 5 | Henschel mixer | 100 | 2.0 | Silica particles (3) | 1.0 |

| | Resin coating layer composition (parts by mass) | | | | | |
|---|---|---|---|---|---|---|
| | Inorganic particles Percentage in the coating layer (%) | Second resin particles | Electrically conductive particles | Total amount of the resin coating layer | Average thickness (μm) | Percentage of the aggregates of inorganic particles (% by number) |
| Example 1 | 33.3 | — | — | 3.0 | 1.0 | 75 |
| Example 2 | 42.0 | 0.4 | 0.15 | 4.1 | 1.4 | 62 |
| Example 3 | 26.2 | 0.15 | 0.04 | 2.3 | 0.8 | 50 |
| Example 4 | 33.3 | — | — | 3.0 | 1.0 | 85 |
| Example 5 | 33.3 | — | — | 3.0 | 1.0 | 55 |
| Example 6 | 33.3 | — | — | 3.0 | 1.0 | 60 |
| Example 7 | 33.3 | — | — | 3.0 | 1.0 | 75 |
| Example 8 | 33.3 | — | — | 3.0 | 1.7 | 75 |
| Comparative Example 1 | 33.3 | — | — | 3.0 | 1.0 | 0 |
| Comparative Example 2 | 33.3 | — | — | 3.0 | 1.0 | 20 |
| Comparative Example 3 | 33.3 | — | — | 3.0 | 1.0 | 40 |
| Comparative Example 4 | | — | — | 3.0 | 1.0 | 0 |

TABLE 1-1-continued

| | | | | | | |
|---|---|---|---|---|---|---|
| Comparative Example 5 | 33.3 | — | — | 3.0 | 1.0 | 70 |

TABLE 1-2

| | Carrier characteristics | | | | | | | |
|---|---|---|---|---|---|---|---|---|
| | Volume-average diameter of carrier particles (µm) | Arithmetic mean diameter of the aggregates of inorganic particles (nm) | Percentage surface exposure of the magnetic particles (%) | Average cavity width (nm) | Si/C ratio on the carrier surface | Aggregates to coating layer thickness ratio | Aggregate/carrier diameter ratio | Test results Reduction of gloss unevenness |
| Example 1 | 32 | 105 | 0.8 | 200 | 0.3 | 0.105 | 0.003 | B |
| Example 2 | 35 | 140 | 0.5 | 200 | 0.4 | 0.104 | 0.004 | C |
| Example 3 | 31 | 80 | 1.5 | 200 | 0.2 | 0.105 | 0.003 | C |
| Example 4 | 33 | 115 | 0.7 | 200 | 0.8 | 0.115 | 0.003 | A |
| Example 5 | 34 | 85 | 2 | 200 | 0 | 0.085 | 0.003 | C |
| Example 6 | 36 | 80 | 1 | 200 | 0.25 | 0.080 | 0.002 | C |
| Example 7 | 34 | 95 | 1 | 100 | 0.3 | 0.095 | 0.003 | C |
| Example 8 | 53 | 45 | 0.5 | 200 | 0.3 | 0.026 | 0.001 | C |
| Comparative Example 1 | 33 | 25 | 15 | 30 | 1.0 | 0.025 | 0.001 | E |
| Comparative Example 2 | 36 | 15 | 3 | 250 | 0.3 | 0.015 | 0.0004 | D |
| Comparative Example 3 | 32 | 25 | 10 | 30 | 0.3 | 0.025 | 0.001 | E |
| Comparative Example 4 | 35 | 0 | 1 | 200 | 0 | 0.000 | 0 | D |
| Comparative Example 5 | 35 | 170 | 0 | 200 | 0.3 | 0.170 | 0.005 | D |

As can be seen from the results, the carriers of the Examples may help reduce unevenness in the gloss of the resulting image compared with those of the Comparative Examples.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A carrier for developing an electrostatic charge image, the carrier comprising:
- magnetic particles; and
- a resin coating layer covering the magnetic particles, the resin coating layer comprising aggregates of inorganic particles, wherein:
- an arithmetic mean diameter of the aggregates of inorganic particles on a carrier surface is 30 nm or more and 150 nm or less; and
- a percentage surface exposure of the magnetic particles is 0% by area or more and 5% by area or less,
- wherein the resin coating layer further comprises electrically conductive particles,
- wherein the aggregates of inorganic particles are aggregates of silica particles.

2. The carrier according to claim 1, wherein a cavity lies at least in part between the resin coating layer and a surface of the magnetic particles.

3. The carrier according to claim 2, wherein an average width, or an average length parallel to thickness of the resin coating layer, of the cavity is 50 nm or more and 300 nm or less.

4. The carrier according to claim 1, wherein a Si/C ratio on the carrier surface as measured by x-ray photoelectron spectroscopy is 0.05 or higher and 1.5 or lower.

5. The carrier according to claim 4, wherein the Si/C ratio on the carrier surface as measured by x-ray photoelectron spectroscopy is 0.05 or higher and 1.0 or lower.

6. The carrier according to claim 1, wherein the resin coating layer further comprises a binder polymer and resin particles.

7. The carrier according to claim 1, wherein an inorganic particles content including the aggregates of inorganic particles is 15% by mass or more and 60% by mass or less of a total mass of the resin coating layer.

8. The carrier according to claim 7, wherein the inorganic particles content including the aggregates of inorganic particles is 20% by mass or more and 45% by mass or less of the total mass of the resin coating layer.

9. The carrier according to claim 1, wherein an average diameter of primary particles of the inorganic particles in the aggregates of inorganic particles is 5 nm or more and 50 nm or less.

10. The carrier according to claim 1, wherein an arithmetic mean diameter of the aggregates of inorganic particles divided by an average thickness of the resin coating layer is 0.01 or greater and 0.3 or smaller.

11. The carrier according to claim 1, wherein an arithmetic mean diameter of the aggregates of inorganic particles divided by a volume-average diameter of particles of the carrier is 0.003 or greater and 0.01 or smaller.

12. The carrier according to claim 1, wherein a percentage of the aggregates of inorganic particles to all inorganic particles in the resin coating layer is 50% by number or more and 90% by number or less.

13. An electrostatic charge image developer comprising:

the carrier according to claim 1; and a toner configured to develop an electrostatic charge image.

14. A process cartridge attachable to and detachable from an image forming apparatus, the process cartridge comprising:

a developing component that comprises the electrostatic charge image developer according to claim 13 and develops, using the electrostatic charge image developer, an electrostatic charge image on a surface of an image carrier to form a toner image.

15. An image forming method comprising:

charging at least an image carrier;

forming an electrostatic latent image on a surface of the image carrier by exposing the image carrier to light;

developing, using an electrostatic charge image developer, the electrostatic latent image on the surface of the image carrier to form a toner image, the developer being the electrostatic charge image developer according to claim 13;

transferring the toner image on the surface of the image carrier to a surface of a transfer medium; and fixing the toner image.

16. An image forming apparatus comprising:

an image carrier;

a charging configured to charge the image carrier;

an exposure component configured to form an electrostatic latent image on the image carrier by exposing the charged image carrier to light;

a developing component configured to develop, using an electrostatic charge image developer, the electrostatic latent image to form a toner image, the developer being the electrostatic charge image developer according to claim 13;

a transfer component configured to transfer the toner image from the image carrier to a transfer medium; and a fixing component configured to fix the toner image.

17. The carrier according to claim 1, wherein the electrically conductive particles contain carbon black.

18. The carrier according to claim 1, wherein the electrically conductive particles consist of carbon black.

19. The carrier according to claim 1, wherein an amount of electrically conductive particles added to the resin coating layer are 0.01 parts by mass or more and 10 parts by mass or less per 100 parts by mass of the magnetic particles.

* * * * *